United States Patent
Arnott et al.

(10) Patent No.: US 9,872,308 B2
(45) Date of Patent: Jan. 16, 2018

(54) COMMUNICATION SYSTEM

(71) Applicant: NEC Corporation, Minato-ku, Tokyo (JP)

(72) Inventors: Robert Arnott, London (GB); Tao Guo, Woking (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/761,490

(22) PCT Filed: Jan. 24, 2014

(86) PCT No.: PCT/JP2014/052182
§ 371 (c)(1),
(2) Date: Jul. 16, 2015

(87) PCT Pub. No.: WO2014/119701
PCT Pub. Date: Aug. 7, 2014

(65) Prior Publication Data
US 2015/0351118 A1    Dec. 3, 2015

(30) Foreign Application Priority Data

Jan. 30, 2013  (GB) .................................. 1301656.3

(51) Int. Cl.
*H04W 4/00*  (2009.01)
*H04W 72/12* (2009.01)
(Continued)

(52) U.S. Cl.
CPC ....... *H04W 72/1242* (2013.01); *H04W 16/10* (2013.01); *H04W 16/14* (2013.01);
(Continued)

(58) Field of Classification Search
CPC ......... H04W 72/1242; H04W 72/0453; H04W 24/08; H04W 16/10; H04W 16/14; H04W 88/08
See application file for complete search history.

(56) References Cited

U.S. PATENT DOCUMENTS

2007/0121539 A1 * 5/2007 Kikuchi ................ H04M 15/51
370/328
2009/0154415 A1   6/2009 Park et al.
(Continued)

FOREIGN PATENT DOCUMENTS

EP   1220557 A1   7/2002
EP   1695581 A1   6/2005
(Continued)

OTHER PUBLICATIONS

Al-Qahtani S et al., "An Uplink Admission Control for 3G and Beyond Roaming Based Multi-Operator Cellular Wireless Networks with Multi-Services", Computer Systems and Applications, 2006, IEEE International Conference on. March 8, 2006, Piscataway, NJ, USA, pp. 724-729, XP010909417, ISBN: 978-1-4244-0211-3, p. 724-p. 725, cited in ISR.
(Continued)

*Primary Examiner* — Clemence Han

(57) ABSTRACT

A wireless telecommunication system is described comprising a shared base station able to divide resources between multiple network operators sharing the base station. The base station resources are divided into sets of resources reserved for each network operator respectively and resources shared by all network operators. The shared base station is configured to monitor the usage of its resources by each operator and to determine, for each scheduling round, an appropriate prioritization of communication bearers associated with the network operators.

5 Claims, 8 Drawing Sheets

(51) Int. Cl.
- *H04W 16/10* (2009.01)
- *H04W 72/04* (2009.01)
- *H04W 24/08* (2009.01)
- *H04W 16/14* (2009.01)
- *H04W 88/08* (2009.01)

(52) U.S. Cl.
CPC ....... *H04W 24/08* (2013.01); *H04W 72/0453* (2013.01); *H04W 88/08* (2013.01)

(56) References Cited

U.S. PATENT DOCUMENTS

| | | | | |
|---|---|---|---|---|
| 2010/0202305 A1* | 8/2010 | Wijting | ................ | H04W 16/14 370/252 |
| 2015/0057011 A1* | 2/2015 | Di Girolamo | .... | H04W 74/0808 455/454 |
| 2015/0281974 A1* | 10/2015 | Ghasemzadeh | ....... | H04W 16/14 455/454 |

FOREIGN PATENT DOCUMENTS

| | | |
|---|---|---|
| EP | 2151953 A1 | 2/2010 |
| EP | 2180737 A1 | 4/2010 |
| EP | 2493235 A1 | 8/2012 |
| WO | 2005/039211 A1 | 4/2005 |

OTHER PUBLICATIONS

International Search Report for PCT Application No. PCT/JP2014/052182, dated Aug. 11, 2014.
"An Uplink Admission Control for 3G and Beyond Roaming Based Multi-Operator Cellular Wireless Networks with Multi-Services", Salman Al-Qahtani et al., Computer Systems and Applications, 2006. IEEE International Conference on Mar. 8, 2006, pp. 724-729.
Japanese Office Action for JP Application No. 2015-534303 dated Jul. 20, 2016 with English Translation.

* cited by examiner

COMMUNICATION SYSTEM

This application is a National Stage Entry of PCT/JP2014/052182 filed on Jan. 24, 2014, which claims priority from United Kingdom Patent Application 1301656.3 filed on Jan. 30, 2013, the contents of all of which are incorporated herein by reference, in their entirety.

TECHNICAL FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to the Long Term Evolution (LTE) standard.

BACKGROUND ART

Radio Access Network (RAN) sharing deployment scenarios are known and methods and abilities to facilitate implementations of these scenarios have been introduced into the 3$^{rd}$ Generation Partnership Project (3GPP) standards since Release 5.

RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the on-going operating costs can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a symmetric arrangement in which each operator gets some access to the RAN of the other operator. In the extreme, such an arrangement allows two operators to provide service to the same area with half as many base stations (and therefore with significantly reduced cost) as would be required if no sharing was possible.

RAN sharing is particularly advantageous in areas in which an operator has cell capacity that is underused, as this spare capacity can then be shared with no impact on the original operator's on-going service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

Currently, the standards relating to RAN sharing are limited to two scenarios. In a first scenario, only the RAN base stations themselves are shared by the different operators. In a second scenario, parts of the core network, for example the Evolved Packet Core (EPC) in LTE, can be shared as well as the RAN base stations, further decreasing capital expenditure costs in setting up the network. In each case, sharing of the RAN can be arranged to use split frequencies, in which each operator sharing the RAN has allocated (different) frequency ranges, or may use common frequencies in which the full range of frequencies is available for use by either operator.

The mechanisms for sharing of RANs may also be useful in the case of mergers of operator companies, allowing the two operators to merge their network services without any significant interruptions in service provision.

The recent economic situation has provided further impetus for network operators to reduce costs, and therefore increased the trend to share networks with other operators. However, this trend combined with the uptake of mobile data services resulted in a significant increase in the overall system load without a corresponding increase in capacity.

It is therefore an object of the present invention to improve performance of the communication networks that support RAN sharing.

SUMMARY OF THE INVENTION

In a first aspect, the invention provides a base station for sharing resources of a communication bandwidth between a plurality of network operators including first and second network operators, the base station comprising: means for defining: (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; means for determining, for each of a sequence of sub-frames, whether the resources should be allocated on a shared basis or on a network operator based priority basis, in dependence on respective sizes of the first operator proportion, the second operator proportion and the shared proportion; and means for allocating, for each sub-frame, resources to the communication bearers of the network operators on a shared basis or a network operator based priority basis based on said determining by said determining means.

The determining means may be operable to determine whether the resources should be allocated on a shared basis or on a network operator based priority basis further in dependence on a measure of resource usage. The measure of resource usage for the communication bearers of a network operator may be based on the resources assigned to communication bearers of that network operator in a current sub-frame. Alternatively, the measure of resource usage for the communication bearers of a network operator may be based on the resources assigned to communication bearers of that network operator in at least one previous sub-frame.

The determining means may operable to determine whether the resources should be allocated on a shared basis or on a network operator based priority basis in dependence on respective weightings determined for communication on a shared basis, communication using communication bearers of the first network operator, and communication using communication bearers of the second network operator. In this case, the respective weightings for communication using the communication bearers of the first network operator and for communication using the communication bearers of the second network operator is dependent on a measure of resource usage by the communication bearers of that network operator.

The respective weightings for communication using the communication bearers of the first network operator and for communication using the communication bearers of the second network operator may be represented by the following equation:

$$w_{g,j} = \frac{t_g^{rsv}}{t_{g,j}^{exp}}$$

where $w_{g,j}$ is the weighting for communication using the communication bearers of a network operator denoted 'g' in a sub-frame denoted 'j', $t_g^{rsv}$ is the size of an operator proportion for network operator denoted 'g', and $t_{g,j}^{exp}$ is the measure of resource usage by network operator denoted 'g' as measured for sub-frame denoted 'j'.

The measure of resource usage by network operator denoted 'g' as measured for sub-frame denoted 'j' may be represented by the following equation:

$$t_{g,j}^{exp} = (1-\beta)t_{g,j-1}^{exp} + \beta \frac{N_{g,j-1}}{K}$$

where $t_{g,j}^{exp}$ is the measure of resource usage by network operator denoted 'g' as measured for sub-frame denoted 'j'; $\beta$ is a forgetting factor parameter in the range 0 to 1; K is the number of resources in the communication bandwidth; $N_{g,j-1}$ is the total number of resources assigned in a sub-frame immediately preceding sub-frame denoted 'j' to all communication bearers of a network operator denoted 'g'.

The measure of resource usage by network operator denoted 'g' as measured for sub-frame denoted 'j' may be represented by the following equations:

$$t_{g,j}^{exp} = (1-\gamma)t_{g,j-1}^{exp} + \gamma \frac{N_{g,j-1}}{K}$$

where $$\gamma = \max\left(\beta, \frac{1}{n_g}\right)$$

and where $t_{g,j}^{exp}$ is the measure of resource usage by network operator denoted 'g' as measured for sub-frame denoted 'j'; $\beta$ is a forgetting factor parameter in the range 0 to 1; K is the number of resources in the communication bandwidth; $N_{g,j-1}$ is the total number of resources assigned in a sub-frame immediately preceding sub-frame denoted 'j' to all communication bearers of a network operator denoted 'g'; and $n_g$ is a counter which is incremented every sub-frame if communication bearers belonging to a network operator denoted g are present and is reset to 1 if no communication bearers belonging to network operator denoted g are present.

The weighting for communication on a shared basis may be dependent on a measure of combined resource usage by the communication bearers of the plurality of network operators.

The measure of resource usage for communication on a shared basis may be based on the resources assigned to communication bearers of each of the plurality of network operators in a current sub-frame.

The measure of resource usage for communication on a shared basis may be based on the resources assigned to communication bearers of each of the plurality of network operators in at least one previous sub-frame.

The weighting for communication on a shared basis may be represented by the following equation:

$$w_{shared,j} = \frac{t_{shared}^{rsv}}{t_{shared,j}^{exp}}$$

where $w_{shared,j}$ is the weighting for communication on a shared basis in a sub-frame denoted 'j', $t_{shared}^{rsv}$ is the size of the shared proportion, and $t_{g,j}^{exp}$ is the sum of respective measures of resource usage by each of the plurality of network operators as measured for sub-frame denoted 'j'.

The sum of respective measures of resource usage by each of the plurality of network operators as measured for sub-frame denoted 'j' may be represented by the following equation:

$$t_{shared,j}^{exp} = (1-\beta)t_{shared,j-1}^{exp} + \beta \frac{N_{shared,j-1}}{K}$$

where $t_{shared,j}^{exp}$ is the sum of respective measures of resource usage by each of the plurality of network operators as measured for sub-frame denoted 'j'; $\beta$ is a forgetting factor parameter in the range 0 to 1; K is the number of resources in the communication bandwidth; $N_{shared,j-1}$ is the total number of resources assigned to all communication bearers of all network operators in a sub-frame immediately preceding sub-frame denoted 'j'.

The determining means may be operable to determine that resources should be allocated on a network operator based priority basis when said weighting determined for communication using communication bearers of the first network operator, or said weighting determined for communication using communication bearers of the second network operator, is higher than said weighting determined for communication on a shared basis.

The determining means may be operable to determine a priority order for allocation of resources in which resources are allocated to communication bearers of the first network operator before resources are allocated to communication bearers of the second network operator when said weighting determined for communication using communication bearers of the first network operator is higher than said weighting determined for communication using communication bearers of the second network operator.

The respective weightings for communication using the communication bearers of the first network operator and for communication using the communication bearers of the second network operator may be dependent on historic allocation of resources to the communication bearers of that network operator during at least one previous scheduling opportunity.

The determining means may be operable to determine that resources should be allocated on a shared basis when said weighting determined for communication on a shared basis is higher than each said weighting determined for communication using the respective communication bearers of each of said plurality of network operators.

In a sub-frame for which resources are to be allocated on a shared basis, communication bearers may be allocated without using a network operator based priority. Alternatively, in a sub-frame for which resources are to be allocated on a shared basis, communication bearers may be allocated using a network operator based priority basis having a priority order which changes depending on the sub-frame for which resources are to be allocated.

The allocating means may be further operable to prioritise Guaranteed Bit Rate ('GBR') communication bearers over non-GBR communication bearers whilst allocating said resources on a shared basis.

The allocating means may be further operable to prioritise, for each operator in turn, Guaranteed Bit Rate ('GBR') communication bearers over non-GBR communication bearers whilst allocating said resources on a shared basis.

The determining means may be operable to determine a network operator based priority order for allocation of resources when said determining means determines that said resources should be allocated on a network operator based priority basis.

The base station may further comprise means for controlling admission of a new communication bearer for a specific network operator in dependence on the size of the operator proportion for that specific network operator.

In a second aspect, the invention also provides a base station for sharing resources of a communication bandwidth between a plurality of network operators including first and second network operators, the base station comprising: means for defining: (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; means for controlling admission of a new communication bearer into one of said first operator proportion, said second operator proportion, in dependence on the size of an operator proportion for that specific network operator.

The admission controlling means may be operable to admit said new communication bearer in dependence on an estimate of a current load across all communication bearers of said specific network operator and/or an estimate of an expected additional load that will result if said new communication bearer is admitted.

The admission controlling means may be operable to admit said new communication bearer when the following condition is met:

$$\rho_g + \rho_{new} < \rho_g^{(th)} t_g^{rsv}$$

where $\rho_g$ is an estimated current load represented by all communication bearers of network operator g; $\rho_{new}$ is an estimate of an expected additional load that will result if said new communication bearer is admitted; $\rho_g^{(th)}$ is an operator specific threshold value expressed as a fraction of the respective proportion of the resources of operator g, selected between 0 and 1; and $t_g^{rsv}$ is the size of the proportion of operator g.

The admission controlling means may be operable to apply at least one further admission condition if said condition is not met.

The admission controlling means may be operable to reject admission of said new communication bearer into said shared proportion if said condition is not met and said at least one further admission condition is not met.

Compliance with said at least one further admission condition may be determined based on whether an estimated expected load if the new communication bearer were to be admitted is no more than a predefined fraction (between 0 and 1) of the communication bandwidth remaining when an estimated load associated with the communication bearers of each of the other network operator is taken into account.

Compliance with said at least one further admission condition may be determined based on whether an estimated expected load if the new communication bearer were to be admitted is no more than a predefined fraction (between 0 and 1) of the communication bandwidth remaining when the respective operator proportion associated with each other network operator is taken into account.

The admission controlling means may be operable to determine that said at least one further admission condition has been met when:

$$\rho_g + \rho_{new} < \rho_g^{(th)}\left(1 - \sum_{k \neq g} \max\left(\frac{\rho_k}{\rho_k^{(th)}}, t_k^{rsv}\right)\right)$$

where $\rho_g$ is an estimated current load represented by all communication bearers of network operator g; $\rho_{new}$ is an estimate of an expected additional load that will result if said new communication bearer is admitted; $\rho_g^{(th)}$ is an operator specific threshold value expressed as a fraction of the respective proportion of the resources of operator g, selected between 0 and 1; and $$1 - \sum_{k \neq g} \max\left(\frac{\rho_k}{\rho_k^{(th)}}, t_k^{rsv}\right)$$

is a proportion of the resources used by any communication bearers not associated with network operator g.

Compliance with said at least one further admission condition may be determined based on whether an estimated expected load if the new communication bearer were to be admitted, and if resources were allocated to the new communication bearer on a shared basis, is no more than a predefined fraction (between 0 and 1) of the shared proportion of the communication bandwidth.

The admission controlling means may be operable to determine that said at least one further admission condition has been met when:

$$\rho_{shared} + \Delta\rho_{shared} < \rho_{shared}^{(th)} t_{shared}^{rsv}$$

where $\rho_{shared}$ is a current load represented by all communication bearers in said shared proportion of the resources; $\Delta\rho_{shared}$ is an expected change in a current load in said shared proportion if said new communication bearer would be admitted in said shared proportion; $\rho_{shared}^{(th)}$ is a threshold value expressed as a fraction of the shared proportion of the resources, selected between 0 and 1; and $t_{shared}^{rsv}$ is the size of said shared proportion. $\rho_{shared}$ may be calculated as:

$$\rho_{shared} = \sum_k \max(\rho_k - \rho_k^{(th)} t_k^{rsv}, 0)$$

where $\rho_k$ is a current load represented by all communication bearers of network operator k; $\rho_k^{(th)}$ is an operator specific threshold value expressed as a fraction of the respective proportion of the resources of operator k, selected between 0 and 1; and $t_k^{rsv}$ is the respective proportion of the resources of operator k.

$\Delta\rho_{shared}$ may be calculated as:

$$\Delta\rho_{shared} = \rho_{new} - \max(\rho_g^{(th)} t_g^{rsv} - \rho_g, 0)$$

The admission controlling means may be operable to reject said new communication bearer if said admission condition, and any further admission condition, has not been met.

If said new communication bearer can be classified as a non-GBR bearer, said admission controlling means may be operable to admit said new communication bearer.

The shared proportion may comprise the communication bandwidth less said first operator proportion and said second operator proportion.

In another aspect, the invention also provides a mobile communication device for use in a communication system in which a base station shares resources of a communication bandwidth between a plurality of network operators wherein said mobile communication device is associated with at least one of said plurality of network operators, the mobile communication device comprising: means for requesting set up of a new communication bearer for communication in a network of a network operator with which said mobile communication device is associated; means for receiving, from said base station, an allocation of resources associated with a communication bearer of said mobile communications device, on a shared basis or on a network operator based priority basis, in dependence on respective sizes of: (a) a first operator proportion of the resources in said communication bandwidth, which first operator proportion represents a target average minimum proportion of the resources to be prioritised for communication bearers of the network operator with which said mobile communication device is associated, over time; (b) a second operator proportion of the resources in said communication bandwidth, which second operator proportion represents a target average minimum proportion of the resources to be prioritised for communication bearers of another network operator, over time; and (c) a shared proportion of the resources in said communication bandwidth, which shared proportion represents a proportion of the resources to be shared between communication bearers of the network operator with which said mobile communication device is associated and communication bearers of the another network operator; and means for communicating, via said base station, using said new communication bearer and said received allocation of resources.

The mobile communications device may further comprise means for requesting activation of a new communication bearer via said base station including means for indicating resource requirements and/or service type associated with said new communication bearer.

In a further aspect, the invention also provides a base station for sharing resources of a communication bandwidth between a plurality of network operators including first and second network operators, the base station comprising a processor operable to define: (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; determine, for each of a sequence of sub-frames, whether the resources should be allocated on a shared basis or on a network operator based priority basis, in dependence on respective sizes of the first operator proportion, the second operator proportion and the shared proportion; and allocate, for each sub-frame, resources to the communication bearers of the network operators on a shared basis or a network operator based priority basis based on said determining.

The invention also provides a base station for sharing resources of a communication bandwidth between a plurality of network operators including first and second network operators, the base station comprising a processor operable to define: (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; control admission of a new communication bearer into one of said first operator proportion, said second operator proportion, in dependence on the size of an operator proportion for that specific network operator.

The invention also provides a mobile communication device for use in a communication system in which a base station shares resources of a communication bandwidth between a plurality of network operators wherein said mobile communication device is associated with at least one of said plurality of network operators, the mobile communications device comprising a processor operable to: request set up of a new communication bearer for communication in a network of a network operator with which said mobile communication device is associated; receive, from said base station, an allocation of resources associated with a communication bearer of said mobile communication device, on a shared basis or on a network operator based priority basis, in dependence on respective sizes of: (a) a first operator proportion of the resources in said communication bandwidth, which first operator proportion represents a target average minimum proportion of the resources to be prioritised for communication bearers of the network operator with which said mobile communication device is associated, over time; (b) a second operator proportion of the resources in said communication bandwidth, which second operator proportion represents a target average minimum proportion of the resources to be prioritised for communication bearers of another network operator, over time; and (c) a shared proportion of the resources in said communication bandwidth, which shared proportion represents a proportion of the resources to be shared between communication bearers of the network operator with which said mobile communication device is associated and communication bearers of the another network operator; and communicate, via said base station, using said new communication bearer and said received allocation of resources.

The invention also provides a system comprising the above described base station and mobile communication device.

The invention also provides a method performed by a base station for sharing resources of a communication bandwidth between a plurality of network operators including first and second network operators, the method comprising: defining (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; determining, for each of a sequence of sub-frames, whether the resources should be allocated on a shared basis or on a network operator based priority basis, in dependence on respective sizes of the first operator proportion, the second operator proportion and the shared proportion; and allocating, for each sub-frame, resources to the communication bearers of the network operators on a shared basis or a network operator based priority basis based on said determining.

The invention also provides a method performed by a base station for sharing resources of a communication bandwidth between a plurality of network operators including first and second network operators, the method comprising: defining (a) a first operator proportion of the resources in said communication bandwidth, which first operator proportion represents a target average minimum proportion of the resources to be prioritised for communication bearers of the first network operator, over time; (b) a second operator proportion of the resources in said communication bandwidth, which second operator proportion represents a target average minimum proportion of the resources to be prioritised for communication bearers of the second network operator, over time; and (c) a shared proportion of the resources in said communication bandwidth, which shared proportion represents a proportion of the resources to be shared between communication bearers of the first network operator and communication bearers of the second network operator; controlling admission of a new communication bearer into one of said first operator proportion, said second operator proportion, in dependence on the size of an operator proportion for that specific network operator.

The invention also provides a method performed by a mobile communication device in a communication system in which a base station shares resources of a communication bandwidth between a plurality of network operators wherein said mobile communication device is associated with at least one of said plurality of network operators, the method comprising: requesting set up of a new communication bearer for communication in a network of a network operator with which said mobile communication device is associated; receiving, from said base station, an allocation of resources associated with a communication bearer of said mobile communication device, on a shared basis or on a network operator based priority basis, in dependence on respective sizes of: (a) a first operator proportion of the resources in said communication bandwidth, which first operator proportion represents a target average minimum proportion of the resources to be prioritised for communication bearers of the network operator with which said mobile communication device is associated, over time; (b) a second operator proportion of the resources in said communication bandwidth, which second operator proportion represents a target average minimum proportion of the resources to be prioritised for communication bearers of another network operator, over time; and (c) a shared proportion of the resources in said communication bandwidth, which shared proportion represents a proportion of the resources to be shared between communication bearers of the network operator with which said mobile communication device is associated and communication bearers of the another network operator; and communicating, via said base station, using said new communication bearer and said received allocation of resources.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF DRAWINGS

An exemplary embodiment of the invention will now be described, by way of example, with reference to the accompanying drawings in which.

DESCRIPTION OF EMBODIMENTS

Overview

Figure 1:
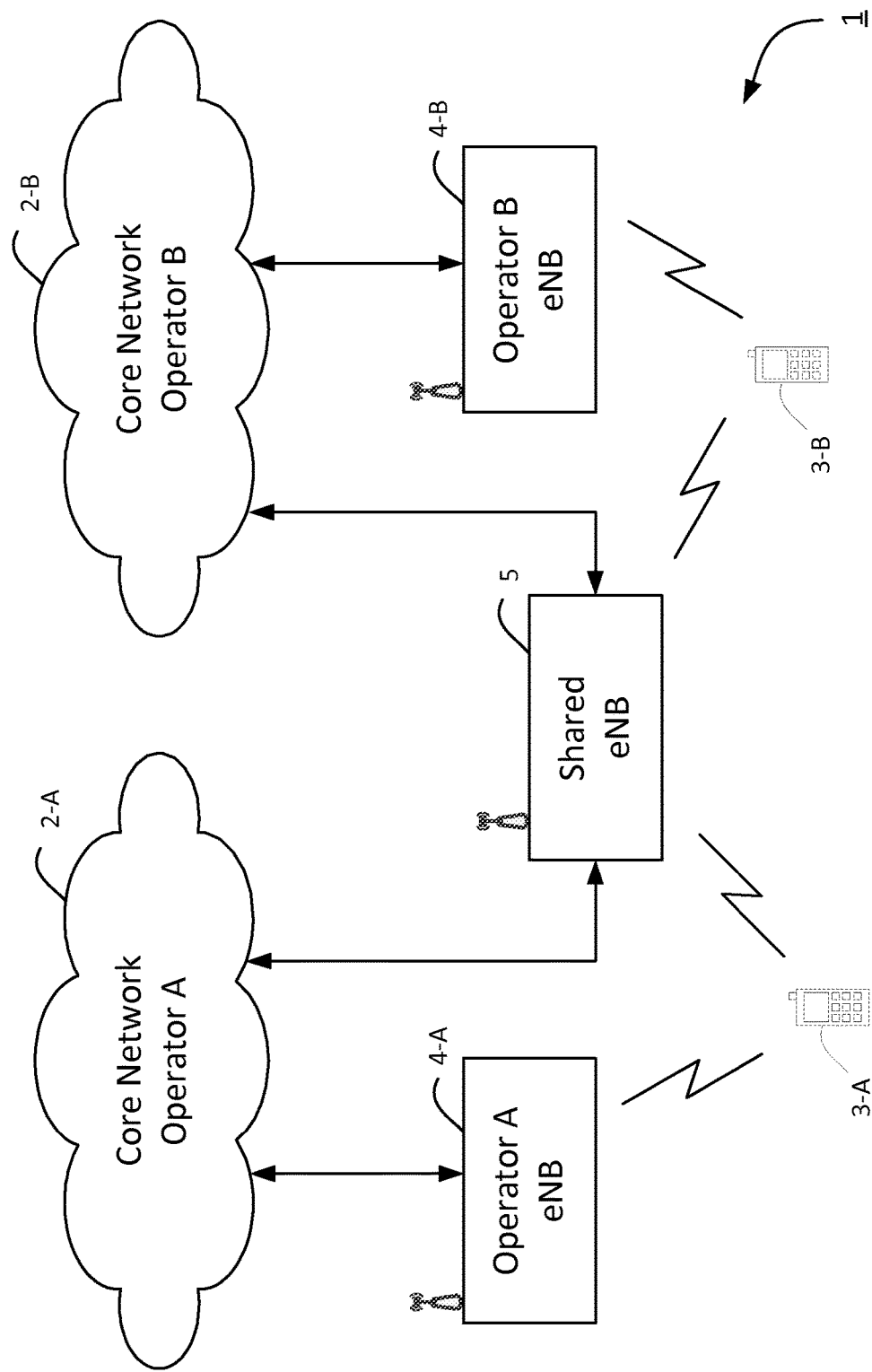
FIG. 1 schematically illustrates a mobile telecommunication system of a type to which the invention is applicable.

FIG. 1 schematically illustrates a mobile (cellular) telecommunication system 1 in which two network operators, operators A and B, are able to provide a mobile wireless communications service. Operator A has a core network 2-A and operator B a core network 2-B. Each operator may also provide one or more base stations or eNBs 4-A, 4-B as part of a radio access network (RAN) for allowing one or more mobile telephones, or other such user equipment, 3-A, 3-B to connect to their network and receive the service. As will be understood by those skilled in the art, each base station 4 operates one or more base station cells in which communications can be made between the base station 4 and the mobile telephones 3. For an eNB 4 associated with an operator, such as eNB 4-A associated with operator A, typically only mobile telephones 3-A associated with the relevant operator are able to connect and interact with the wireless communication system via that eNB 4-A. Thus, only mobile telephones 3-A configured to access services via service provider A are able to connect to the network via operator A's eNB 4-A without "roaming" away from their home network.

The telecommunication system 1 further includes a shared base station 5 (denoted shared eNB 5). The shared base station 5 might be owned and operated operator A or operator B or a third party (e.g. a further network operator). Alternatively, the shared base station 5 might be jointly owned and operated by operators A and B. In any case, operators A and B agree to share in the capacity of the shared eNB 5 such that both the mobile telephone 3-A associated with operator A and the mobile telephone 3-B associated with operator B are able to connect to the network via the shared eNB 5 as though connecting through equipment provided by their own respective network operator. Thus, the mobile telephone 3-A may connect or handover to the shared eNB 5 as though the shared eNB 5 is an eNB associated with operator A, while the mobile telephone 3-B is able to connect to the shared eNB 5 as though the shared eNB 5 is an eNB associated with operator B.

Such an arrangement may be particularly useful, for example, in areas of low population density, or more generally areas having low bandwidth requirements, in order to allow both network operators to provide their service to that area without requiring both network operators to install their own RAN in that area. In contrast, in areas with higher capacity requirements the network operators may choose to install their own RANs rather than sharing capacity.

The shared base station 5 can be connected to by mobile telephones 3 associated with either of the network operators A or B that share the base station 5, as though that base station 5 was a base station belonging to the respective network operator.

It is noted that the RAN sharing employed in the telecommunication system 1 is significantly different to a 'roaming' mechanism in which a mobile telephone associated with a first network operator forms a connection via the network of a different service provider.

Specifically, in a roaming situation, the connection with the mobile telephone is monitored and controlled by the visited network which then subsequently bills the home network of the mobile telephone (generally resulting in significantly increased cost to the end user). In contrast, the sharing of the radio access network, as in the current exemplary embodiment, is transparent to users of the network, and monitoring and control of connections is performed using standard mechanisms as though the mobile telephone was connected via the network operator's own RAN.

In the telecommunication system 1 of FIG. 1, each operator's network is typically associated with a unique PLMN (Public Land Mobile Network) id value, which is used in the wireless communication network to identify connections associated with a particular network operator. Typically, the network operators will contract to be provided with a certain proportion of the resources available at the shared base station 5. In this exemplary embodiment, for security reasons, connections relating to a particular network operator are distinguished from connections relating to other network operators, e.g. based on the PLMN id value associated with each connection.

Data is communicated between the base stations 4, 5 and user equipment using radio frames (typically of 10 ms duration in LTE) comprising a number (typically ten) sub-frames with each sub-frame comprising a pair of 'slots'. In the frequency domain each slot is divided into frequency resource blocks each comprising a plurality (typically twelve in LTE) sub-carriers. Within each slot, therefore, resources can be allocated to user equipment using units of frequency referred to as physical resource blocks (PRBs), each of which represents the smallest unit of resources that can be allocated to any user equipment 3 transmitting/receiving data over the air interface. When a particular communication instance is first initiated for a particular piece of user equipment 3 a communication bearer is set up, from the user equipment 3, for guiding the data being communicated through the network. Sufficient resources (e.g. PRBs) are allocated to the communication bearer, by the base station 4, 5 to enable successful communication.

In the telecommunication system 1, transmitted data can be classified to belong to either Guaranteed Bit Rate (GBR) or Non-Guaranteed Bit Rate (non-GBR) services. GBR services (sometimes referred to as 'real-time' services) are generally less tolerant to delays and hence require a constant minimum bandwidth allocated to them throughout the whole network, including the air interface between the shared base station 5 and the mobile telephones 3. GBR services typically include, for example, voice calls, multimedia telephony, mobile TV, real-time video (live or buffered video stream), real-time gaming, and the like, and associated data are often transmitted as a continuous flow. On the other hand, non-GBR services (sometimes referred to as 'non-real-time' services) are relatively tolerant to delays. Thus, if network resources are limited, non-GBR data may be sent in discontinuous bursts rather than as a continuous data stream. Non-GBR services typically include, for example, internet browsing, email, file download, interactive gaming, online chat, point-to-point file sharing, File Transfer Protocol (FTP) traffic, and the like.

In this exemplary embodiment, the shared base station 5 schedules data transmission by taking into account which operator a particular communication bearer belongs to. For each operator sharing the base station 5, the shared eNB 5 is beneficially able to provide, on average, a respective guaranteed minimum quantity of resources (e.g. number of PRBs per sub-frame). The minimum guaranteed quantity of resources for a particular operator can be considered, effectively, to be a reserved proportion (also referred to as a 'reserved part') of the total available resources in which that operator's communications have priority over those of other operators, regardless of the traffic type (GBR/non-GBR) of the other operator's communications. Beneficially, however, the sum of each operator's reserved proportions of the total available resources is less than the total available resources. The remaining proportion of the total available resources is, deliberately, reserved as a shared proportion (or 'shared part') that may be used for the communication bearers of either operator, for example, after they have fully utilised their own reserved resources. When necessary, access to the shared proportion of the available resources is advantageously allocated on a traffic type priority basis in which a higher priority is given to GBR communication regardless of which operator the communication is associated with.

Prior to resources being allocated, when authorising new communication bearers, the shared base station 5 utilises an admission control mechanism to ensure that a number of predetermined conditions are met before a new communication bearer is allowed to be set up for user equipment associated with either operator. Admission control helps to protect the quality of service (QoS) of active communication bearers by blocking new communication bearers when the telecommunication system 1 is approaching overload.

In this exemplary embodiment, when authorising new communication bearers using an operator's reserved proportion of the available resources, the admission control employed by the shared base station 5 does not block any new communication bearers associated with that operator when that operator's reserved proportion still has sufficient remaining capacity to admit the bearer whilst maintaining a sufficient QoS for active communication bearers. When authorising new communication bearers using the shared proportion of the resources, however, the shared base station 5 utilises the admission control to admit new communication bearers associated with any operator, on a first-come first-served basis, provided that the operator's reserved proportion of available resources does not have sufficient remaining capacity to admit the new bearer whilst maintaining a sufficient QoS for active communication bearers.

The group of communication bearers authorised to use the reserved proportion of the available resources associated with a particular operator is referred to as that operator's 'slice'. The group of communication bearers authorised to use the shared proportion of the available resources (generally all communication bearers regardless of network operator) is referred to as a 'shared slice'. In operation resources are allocated to the bearers of each slice based on a respective weighting for that slice. Each weighting is determined based on the respective proportion of available resources which the bearers of the associated slice are authorised to use and the measured proportion of resources that are currently being used for that slice.

Therefore, the network operators sharing the base station 5 are able to temporarily exceed their allocated/agreed capacity by scheduling transmissions using the shared resources given that these predetermined conditions are met. This will advantageously result in improved service continuity for the users of these network operators without any of the network operators having to commit to (and thus pay for) larger capacity of the shared base station 5 than they would normally require.

Shared Base Station (eNB)

Figure 2:
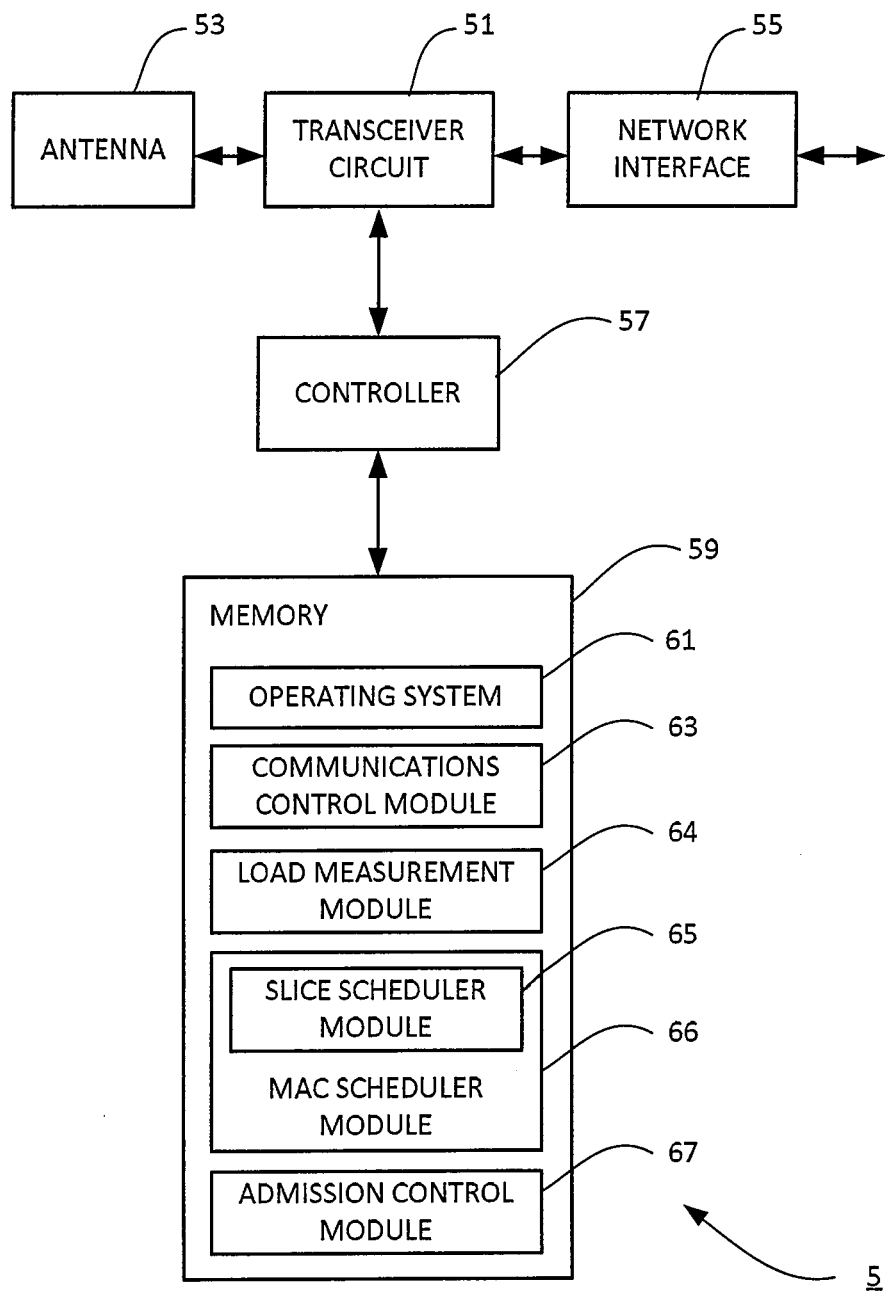
FIG. 2 is a block diagram of a shared base station suitable for use in the telecommunications networks of FIG. 1.

FIG. 2 is a block diagram illustrating the main components of the shared base station 5 shown in FIG. 1. As shown, the shared base station 5 includes a transceiver circuit 51 which is operable to transmit signals to and to receive signals from the mobile telephones 3 via one or more antennae 53 and which is operable to transmit signals to and to receive signals from the core networks 2 and/or other base stations 4 via a network interface 55. The network interface 55 typically includes an S1 interface for communicating with the core networks 2 and an X2 interface for communicating with other base stations. A controller 57 controls the operation of the transceiver circuit 51 in accordance with software stored in a memory 59. The software includes, among other things, an operating system 61, a communications control module 63, a load measurement module 64, a slice scheduler module 65, a MAC scheduler module 66, and an admission control module 67.

The communications control module 63 is operable to control the communication between the shared base station 5 and the mobile telephones 3 and other network entities that are connected to the base station 5. The communications control module 63 also controls the separate flows of uplink and downlink user traffic and control data to be transmitted to the communications devices served by the shared base station 5 including, for example, control data for managing operation of the mobile telephones 3.

The load measurement module 64 is operable to carry out measurement of current system load, for example, by calculating the number of physical resource blocks currently used by GBR traffic belonging to each respective network operator sharing the shared base station 5. The results of the load measurements may be provided to the other modules either directly (e.g. upon request) or via the memory 59.

The MAC Scheduler 66 is responsible for dynamically scheduling resources in both the downlink and uplink directions.

The slice scheduler module 65 (which is part of and/or works in conjunction with the MAC scheduler module 66) is operable to allocate PRBs for communication bearers belonging to each operator slice based on the respective reserved proportion of the total available frequency resources for that operator. The slice scheduler module 65 is further operable to allocate PRBs for communication bearers belonging to the shared slice based on the shared proportion of the total available frequency resources.

The admission control module 67 is operable to determine whether or not new communication bearers should be admitted or rejected by taking into account the current system load, e.g. as reported by the load measurement module 64.

Mobile Telephone

Figure 3:
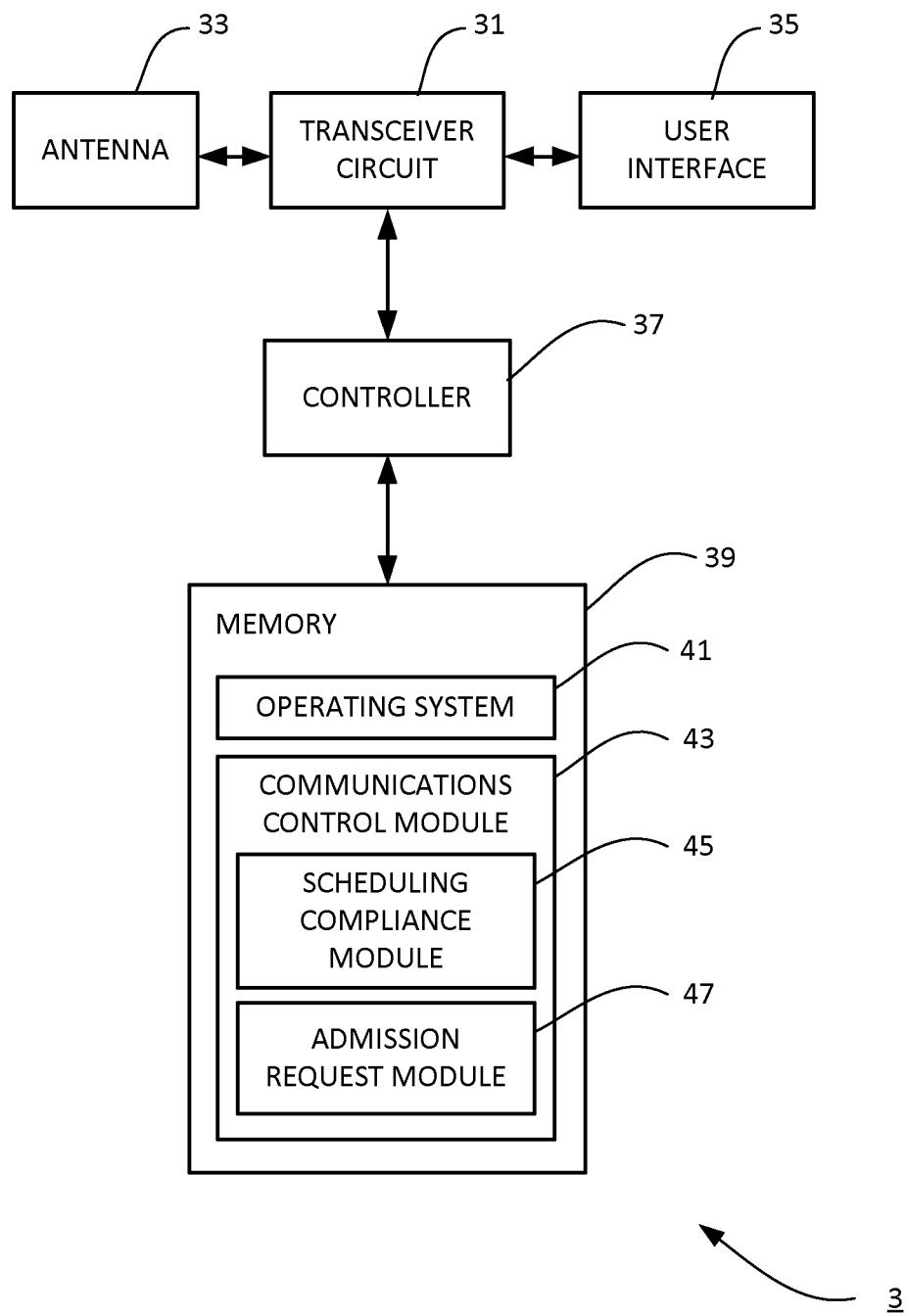
FIG. 3 is a block diagram of a mobile telephone suitable for use in the telecommunications networks of FIG. 1.

FIG. 3 is a block diagram illustrating the main components of the mobile telephone 3 shown in FIG. 1. As shown, the mobile telephone 3 has a transceiver circuit 31 that is operable to transmit signals to and to receive signals from a base station 4, 5 via one or more antenna 33. Although not necessarily shown in FIG. 3, the mobile telephone 3 may of course have all the usual functionality of a conventional mobile telephone 3 (such as a user interface 35) and this may be provided by any one or any combination of hardware, software and firmware, as appropriate. The mobile telephone 3 has a controller 37 to control the operation of the mobile telephone 3. The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within the memory 39. As shown, these software instructions include, among other things, an operating system 41, a communications control module 43, a scheduling compliance module 45, and an admission request module 47.

The communications control module 43 is operable to control the communication between the mobile telephone 3 and the base stations 4, 5. The communications control module 43 also controls the separate flows of uplink data and control data that are to be transmitted to the base station 5. The communications control module 43 includes the scheduling compliance module 45 and the admission request module 47.

The scheduling compliance module 45 is operable to receive information, from the corresponding scheduler module of the base station (such as the MAC/slice scheduler modules of the shared base station 5 or a MAC scheduler module of a conventional base station 4), relating to scheduling of (uplink/downlink) communications for this mobile telephone 3. The scheduling compliance module 45 uses this information to control the resources used for any uplink/downlink communications related to active communication bearers of this mobile telephone 3.

The admission request module 47 is operable to request setting up of new communication bearers for this mobile telephone 3, e.g. when a new service is requested by a user of the mobile telephone 3. The admission control module 47 is also operable to provide information, to the corresponding admission control module 67 of the shared base station 5, relating to the requirements (e.g. type and/or classification and/or a minimum bandwidth, etc.) of the service to be set up, thereby assisting the base station 5 to schedule communications via this bearer appropriately.

In the above description, the shared base station 5 and the mobile telephone 3 are described for ease of understanding as having a number of discrete modules (such as the communications control modules, the slice scheduler module, and the admission control module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—Slice Scheduler

A more detailed description will now be given of the scenario discussed above where the shared base station 5 optimises its resources for transmitting data to/from mobile telephones 3 belonging to more than one network operators.

The slice scheduler module 65, (sometimes referred to as a 'Network Virtualisation Substrate' or 'NVS' slice scheduler), is implemented on top of the MAC scheduler module 66 of the shared base station 5. Each 'slice' can be considered as a set of communication bearers authorised to use at least a proportion of the associated resources.

In this exemplary method, each operator slice corresponds to one operator only, i.e. a slice includes all communication bearers belonging to one operator but no bearers belonging to any other operator. Each operator slice is attributed a slice weight, which is calculated as follows:

$$w_{g,j} = \frac{t_g^{rsv}}{t_{g,j}^{exp}}$$

where g is an operator slice index, $0 \leq t_g^{rsv} \leq 1$ is the size of the reserved proportion for operator g expressed as a fraction of the total resources of the system bandwidth, j is a sub-frame number for the current sub-frame for which resources are to be allocated, and $t_{g,j}^{exp}$ is a measure of resource usage for operator slice g before including the resources assigned in sub-frame j, e.g. calculated using measure(s) of resource usage from the previous sub-frame(s).

The value of $t_{g,j}^{exp}$ is updated at each sub-frame using an exponential weighted moving average:

$$t_{g,j}^{exp} = (1-\beta)t_{g,j-1}^{exp} + \beta \frac{N_{g,j-1}}{K}$$

where β is, effectively, a forgetting factor parameter in the range 0 to 1 (where a value of 1 means that resource usage in previous sub-frames is ignored), K is the number of resources (e.g. PRBs) in the system bandwidth and $N_{g,j-1}$ is the total number of resources assigned in a sub-frame immediately preceding sub-frame j to all communication bearers belonging to operator slice g.

In this exemplary embodiment however, in addition to the respective operator slices for each operator, the slice scheduler module 65 also processes a shared slice, which comprises all communication bearers authorised to use the shared proportion of the available resources of the shared base station 5. Effectively, the shared slice includes all communication bearers of all operators sharing the base station 5.

The shared slice is also attributed a corresponding slice weight which is calculated as follows:

$$w_{shared,j} = \frac{t_{shared}^{rsv}}{t_{shared,j}^{exp}}$$

$$\text{where } t_{shared}^{rsv} = 1 - \sum_g t_g^{rsv}$$

(i.e. the proportion of the system bandwidth remaining once the reserved proportions of each operator are taken into account). $t_{shared}^{rsv}$ is, effectively, the size of the shared proportion expressed as a fraction of the total resources of the system bandwidth.

Sub-frames in which $w_{shared,j} > w_{g,j}$ for all g are classed as 'shared sub-frames'. In shared sub-frames the slice scheduler module 65 treats all active communication bearers as potential candidates for scheduling without prioritisation based on which operator each communication bearer belongs to.

For shared sub-frames, the measured resource usage for the shared slice $t_{shared,j}^{exp}$ is updated at each sub-frame in a similar manner to $t_{g,j}^{exp}$ but is based on a total number of resources (e.g. PRBs) assigned to all scheduled communication bearers in the sub-frame immediately preceding the shared sub-frame j, $N_{shared,j-1}$.

$$t_{shared,j}^{exp} = (1-\beta)t_{shared,j-1}^{exp} + \beta \frac{N_{shared,j-1}}{K}$$

When sub-frame j is treated as a shared sub-frame then number of resources assigned in sub-frame j to communication bearers belonging to operator slice g is treated as being zero (i.e. $N_{g,j}=0$). Similarly, if sub-frame j is not treated as being a shared sub-frame then $N_{shared,j}=0$.

The slice scheduler module 65 calculates the respective weights of each 'slice' for each sub-frame and sets communication priorities according to which slice weight is highest for the given sub-frame. When the slice weight for a particular operator is highest the communication bearers of that operator are prioritised for resource scheduling. When the shared slice weight is highest the communication bearers of different operators are scheduled on a shared basis.

A first example of such scheduling is illustrated in Table 1 below. In the example, of Table 1, there are two operators A and B with reserved proportions of size $t_A^{rsv}=0.1$ and $t_B^{rsv}=0.4$ respectively, the remaining fraction $t_{shared}^{rsv}=0.5$ of the system resources is the shared proportion. Accordingly, as seen in Table 1, over a series of ten consecutive sub-frames, on average, one sub-frame will be scheduled by prioritising for network operator A (i.e. 10% of the time), four sub-frames will be scheduled by prioritising for network operator B (i.e. 40% of the time), and five sub-frames will be scheduled on a shared basis (i.e. 50% of the time). In this example, the sub-frames scheduled on a shared basis are scheduled to communication bearers for operator A or operator B on an arbitrary basis in which neither operator is prioritised.

Once any operator based priority is taken into account, GBR traffic is given priority over non-GBR traffic.

TABLE 1

Example of MAC Scheduler Priority Setting

| Highest slice weight in sub-frame j | Bearer priorities applied in MAC scheduler at sub-frame j | Fraction of sub-frames on average |
|---|---|---|
| $W_{A,j}$ | GBR A > non-GBR A > GBR B > non-GBR B | 10% |
| $W_{B,j}$ | GBR B > non-GBR B > GBR A > non-GBR A | 40% |
| $W_{shared,j}$ | GBR (A or B) > non-GBR (A or B) | 50% |

Accordingly, in the example of Table 1, when an operator's slice weight is highest the slice scheduler module 65 treats communication bearers that belong to that operator (first GBR bearers then non-GBR bearers) before scheduling any communication bearers from other operators. However, in the shared slice the slice scheduler module 65 considers all active communication bearers as candidates for scheduling without regard to operator priority when the shared slice weight is highest. Further, in the shared slice GBR bearers (by any operator) are given priority over non-GBR bearers.

As a variation of this method, when the shared slice weight is highest, the communication bearers of different operators are scheduled on a shared basis as illustrated in Table 2 in which the communication bearers are scheduled based on an operator priority that changes every shared sub-frame, on a 'round-robin' basis, to ensure that each operator's communication bearers are prioritised for scheduling in approximately an equal number of shared sub-frames over time.

In the example of Table 2, as in the example of Table 1, there are two operators A and B with reserved proportions of size $t_A^{rsv}=0.1$ and $t_B^{rsv}=0.4$ respectively, the remaining fraction $t_{shared}^{rsv}=0.5$ of the system resources is the shared proportion.

TABLE 2

Example of MAC Scheduler Priority Setting for Round-Robin Variant

| Highest slice weight in sub-frame j | Bearer priorities applied in MAC scheduler at sub-frame j | Fraction of sub-frames on average |
|---|---|---|
| $W_{A,j}$ | GBR A > non-GBR A > GBR B > non-GBR B | 10% |
| $W_{B,j}$ | GBR B > non-GBR B > GBR A > non-GBR A | 40% |
| $W_{shared,j}$ | If A's turn by round-robin GBR A > non-GBR A > GBR B > non-GBR B | 25% |
| | If B's turn by round-robin GBR B > non-GBR B > GBR A > non-GBR A | 25% |

The above method thus beneficially provides support for partial resource reservation by each network operator (in the above examples, 10% for operator A and 40% for operator B) whilst still permitting either operator to use a significantly larger part of the shared base station 5 resources than their respective reserved parts, if necessary. A particular benefit of this solution is that each operator may even use (some or all of) the reserved part of another operator when that other operator is not fully utilising its own reserved part. In theory, it may even be possible for one operator to use all of the shared base station's 5 resources whilst the other operator(s) have no data to send/receive via that shared base station 5.

Figure 4:
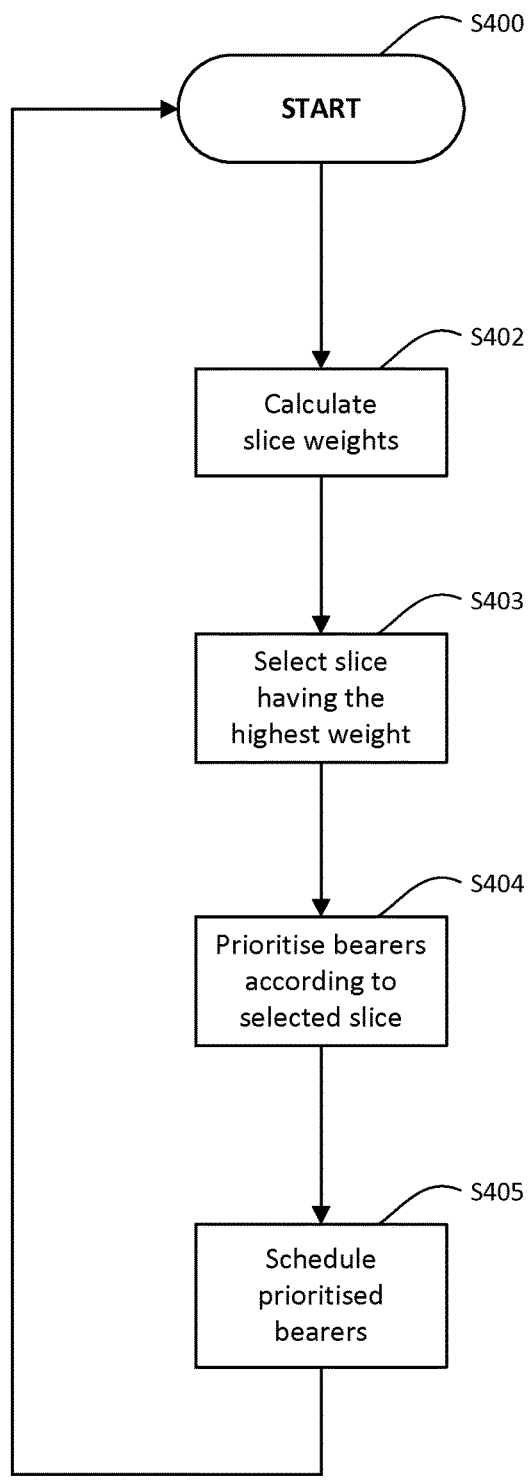
FIG. 4 is an exemplary flowchart illustrating a slice scheduling method performed by a shared base station suitable for use in the telecommunications network of FIG. 1.

FIG. 4 is an exemplary flowchart illustrating a slice scheduling method performed by a shared base station 5 suitable for use in the telecommunication network 1 of FIG. 1. This method is performed for each scheduling round (e.g. sub-frame) by the slice scheduler module 65 of the shared base station 5.

The process begins at step S400, at the start of a scheduling round.

At step S402, the slice scheduler module 65 calculates the weight of each operator slice $$\left(w_{g,j} = \frac{t_g^{rsv}}{t_{g,j}^{exp}}\right)$$

as described in more detail above) and the weight of the shared slice $$\left(w_{shared,j} = \frac{t_{shared}^{rsv}}{t_{shared,j}^{exp}}\right)$$

using the share of each respective operator and the actual capacity that is being used by them.

After calculating all weights, the slice scheduler module 65 proceeds to step S403 in which it selects the slice having the highest weight. This is the slice that defines the scheduling priorities in this scheduling round.

Then, in step S404, the slice scheduler module 65 prioritises the active communication bearers for scheduling according to the prioritisation method that is appropriate for the selected slice (e.g. as illustrated in Tables 1 and 2 above).

In step S405, the slice scheduler 65 schedules resources for the active communication bearers based on the prioritisation of step S404 to the extent possible within the system bandwidth whilst still providing a required QoS.

The slice scheduler module 65 then returns to step S400 and awaits the next scheduling round.

Operation—Admission Control

Beneficially, e.g. in order to protect the Quality of Service (QoS) of the active communication bearers when the system is approaching overload, the shared base station 5 applies Admission Control (AC) for managing the setting up of new communication bearers by the mobile telephones 3 served by this shared base station 5. In particular, new communication bearer requests are admitted or blocked in dependence on the resources available for the respective network operator via the shared base station 5. A more detailed description of an exemplary AC method is given below with reference to FIGS. 5 to 7.

In this example, AC is based on current cell load measurements (which are provided and periodically updated by the load measurement module 64) and an expected additional load caused by the admission of the new communication bearer $\rho_{new}$, which is estimated at the time of AC. The value of $\rho_{new}$ may be assumed to be fixed, or even 0 (e.g. for non-real-time services), since it is often difficult to estimate the additional load for a new communication bearer accurately at the time of AC. The update period for cell load measurements is typically a few hundred sub-frames, e.g. 400 ms. The load can be estimated using various methods that are well known to those skilled in the art, and the precise method is not relevant for the present discussion. A common definition of load, for example, is the resource (e.g. PRB) usage of GBR bearers (e.g. the fraction of total resources in the system bandwidth that are in use for GBR communication bearers). In the case of RAN sharing with multiple operators, a separate load measurement may be obtained for each operator by considering the respective PRB resources used by communication bearers belonging to each operator. However, it is also possible to obtain a common load measurement for all operators that are sharing the base station 5.

Figure 5:
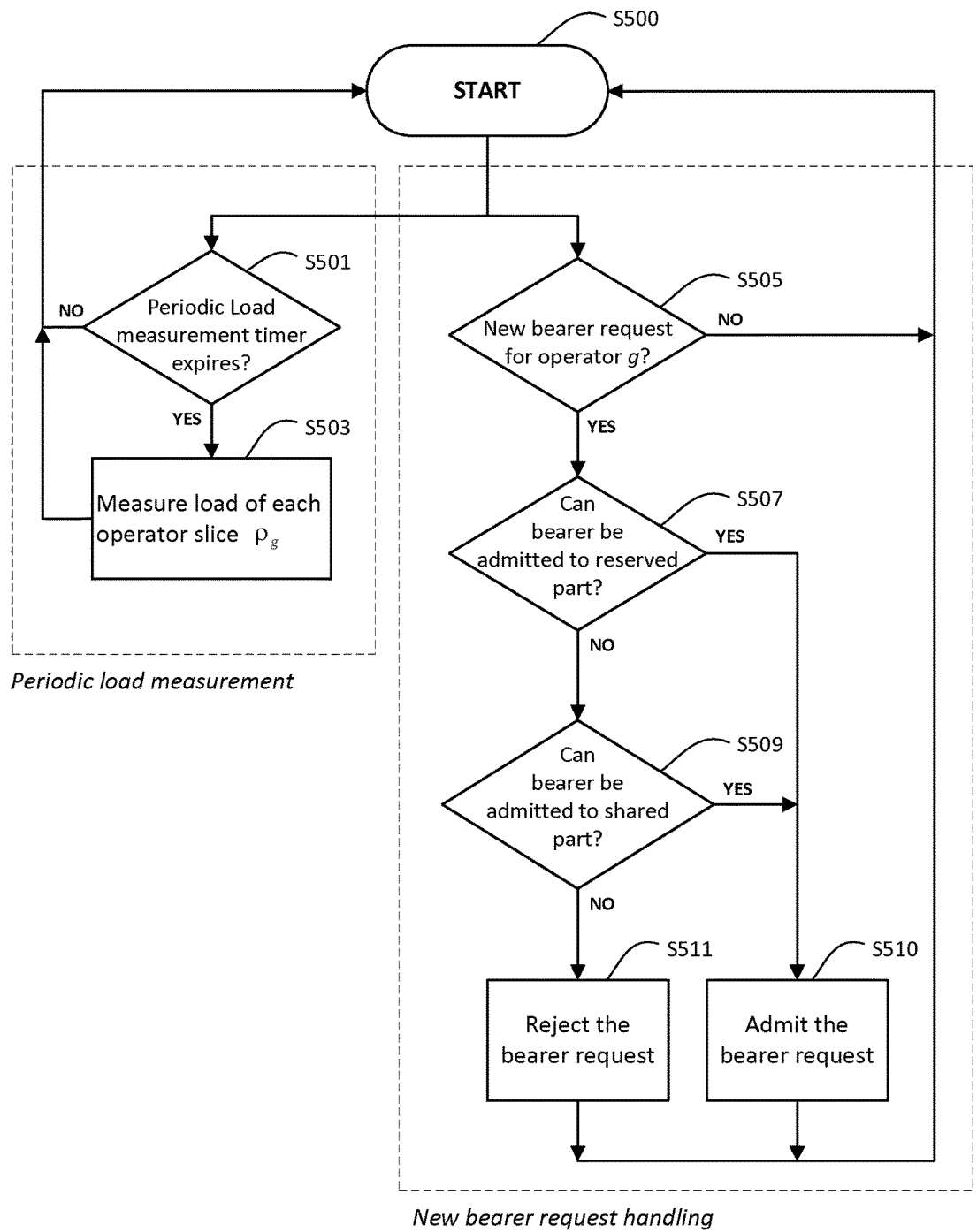
FIG. 5 is an exemplary flowchart illustrating an admission control method performed by a shared base station suitable for use in the telecommunications network of FIG. 1.

FIG. 5 is an exemplary flowchart illustrating an admission control method performed by the shared base station 5 suitable for use in the telecommunication network 1 of FIG. 1. The process may be performed for each operator g served by the shared base station 5 and/or for each scheduling round (e.g. sub-frame to be transmitted on uplink and/or downlink).

Steps S501 to S503 illustrate a periodic load measurement process performed by the load measurement module 64, whilst steps S505 to S511 illustrate a process of handling new communication bearer requests performed by the admission control module 67. It will be appreciated that these two processes may be performed by the shared base station 5 either independently, or as part of a single process.

In this example, the process starts at step S500, in which the admission control module 67 initialises its operation by obtaining load measurement data provided by the load measurement module 64 (e.g. via the memory 59).

In order to provide updated load measurement data, the load measurement module 64 checks, at step S501, whether or not a periodic load measurement timer has expired. If the load measurement module 64 finds that the periodic measurement timer has expired (S501: YES), then it proceeds to step S503 and measures the current load of each operator slice (e.g. by also taking into account the load information provided by the slice scheduler module 65 in step S407 of FIG. 4). The load measurement module 64 provides the results of this measurement to the admission control module 67, for example, by storing them in the memory 59 and discarding any previously stored load measurement data. After the measurement at step S503 is completed (or if the load measurement module 64 finds that the periodic load measurement timer has not expired, (i.e. S501: NO), the load measurement module 64 returns to the start (S500) and awaits the next scheduling round (e.g. the next sub-frame).

At step S505, the admission control module 67 checks if there is a new communication bearer request for operator g. If the admission control module 67 finds that no new communication bearer belonging to operator g requests admission to the system (S505: NO), then it returns to the start of the process (S500) and awaits the next scheduling round.

However, if the admission control module 67 finds that a new communication bearer belonging to operator g requests admission to the system (S505: YES), then it proceeds to step S507 and checks whether or not the given communication bearer (i.e. the new communication bearer for operator g) can be admitted within the proportion of the system bandwidth reserved for this operator g. If the admission control module 67 finds, at step S507, that the new communication bearer for operator g can be admitted within the proportion of the system bandwidth reserved for operator g (S507: YES) then the communication bearer is admitted. Specifically, the admission control module 67 admits the communication bearer for a particular operator and proceeds to step S510 if the estimated total load after admission of the communication bearer will not exceed a predefined fraction of that operator's reserved part of the system bandwidth. More specifically, the communication bearer is admitted if the following condition is met:

$$\rho_g + \rho_{new} < \rho_g^{(th)} t_g^{rsv}$$

where $\rho$ is the current load of operator slice g, $\rho_{new}$ is the additional load expected to result from the admission of the new communication bearer, which is estimated at the time of AC, and $0 < \rho_g^{(th)} \leq 1$ is an AC threshold for operator slice g. $\rho_g$ is defined as the load measured across all the communication bearers belonging to operator g. It will be appreciated that the AC threshold may be different for each operator slice because different operators may wish to set different AC thresholds.

If the admission control module 67 finds, at step S507, that the above condition is not met (S507: NO), i.e. the room in the reserved part of operator g is not sufficient to accommodate the added load of the new communication bearer request (e.g. because the reserved part of operator g is already fully used), then it proceeds to a second stage, step S509, to determine if the communication bearer can be admitted to the shared proportion of the system bandwidth. If the admission control module 67 determines that the communication bearer can be admitted to the shared proportion of the system bandwidth (S509: YES), it proceeds to step S510 and admits the communication bearer request to the shared proportion of the system bandwidth. However, if the communication bearer cannot be admitted to the shared proportion of the system bandwidth either (S509: NO), the admission control module 67 proceeds to step S511 and rejects the communication bearer request. After the current new communication bearer request has been handled (either admitted or rejected) by the admission control module 67, the process returns to step S500 where it starts again for the next operator and/or next scheduling round.

At the second stage (i.e. at step S509) the admission control module 67 may use various admission control methods, two of which will be described in detail below.

AC Method 1

The first exemplary admission control method is based on the idea of total residual capacity. When performing the check at step S509, the admission control module 67 proceeds to step S510 and admits a new communication bearer of operator g if the estimated total load after admission of the communication bearer will not exceed a predefined fraction of the system bandwidth remaining after the part of the system bandwidth being used by all other operators' slices is taken into account (whilst allowing some 'headroom' for each operator slice). More specifically, the communication bearer is admitted if the following condition is met:

$$\rho_g + \rho_{new} < \rho_g^{(th)}\left(1 - \sum_{k \neq g} \max\left(\frac{\rho_k}{\rho_k^{(th)}}, t_k^{rsv}\right)\right)$$

where $\rho_k$ is the current load of operator slice k (as determined by the load measurement module 64) and $0 < \rho_k^{(th)} \leq 1$ is the AC threshold for operator slice k. If this condition is not met then the admission control module 67 proceeds to step S511 and rejects the new communication bearer.

The term $$\max\left(\frac{\rho_k}{\rho_k^{(th)}}, t_k^{rsv}\right)$$

represents the load currently 'occupied' by operator slice k, and therefore it is unavailable to other operators. As can be seen, by calculating the occupied load using an actual load measurement $\rho_k$ divided by the AC threshold $\rho_k^{(th)}$ allows for the 'headroom' that operator slice k needs to remain below its AC threshold. Furthermore each operator slice is assumed always to occupy at least its reserved part $t_k^{rsv}$ even if its actual load is smaller than this.

The term $$1 - \sum_{k \neq g} \max\left(\frac{\rho_k}{\rho_k^{(th)}}, t_k^{rsv}\right)$$

thus represents the total amount of load that may be used by operator slice g, after removing the part occupied by all other operator slices.

In case $$\sum_k t_k^{rsv} = 1$$

(i.e. when there is no shared part), the AC test for admission to the shared part (at S509) simplifies to $\rho_g + \rho_{new} < 0$, which of course is never satisfied. In this case, the AC decision by the admission control module 67 will depend on the first stage test only (step S507) and step S509 may advantageously be omitted.

In case $t_k^{rsv} = 0$ and $\rho_k^{(th)} = \rho^{(th)}$ for all k (i.e. if all resources are shared by all the operators and all operators use the same AC threshold), the AC test for admission to the shared part reduces to $$\sum_k \rho_k + \rho_{new} < \rho^{(th)},$$

which can be recognised as a widely used admission control algorithm for conventional systems without any resource reservation.

Figure 6:
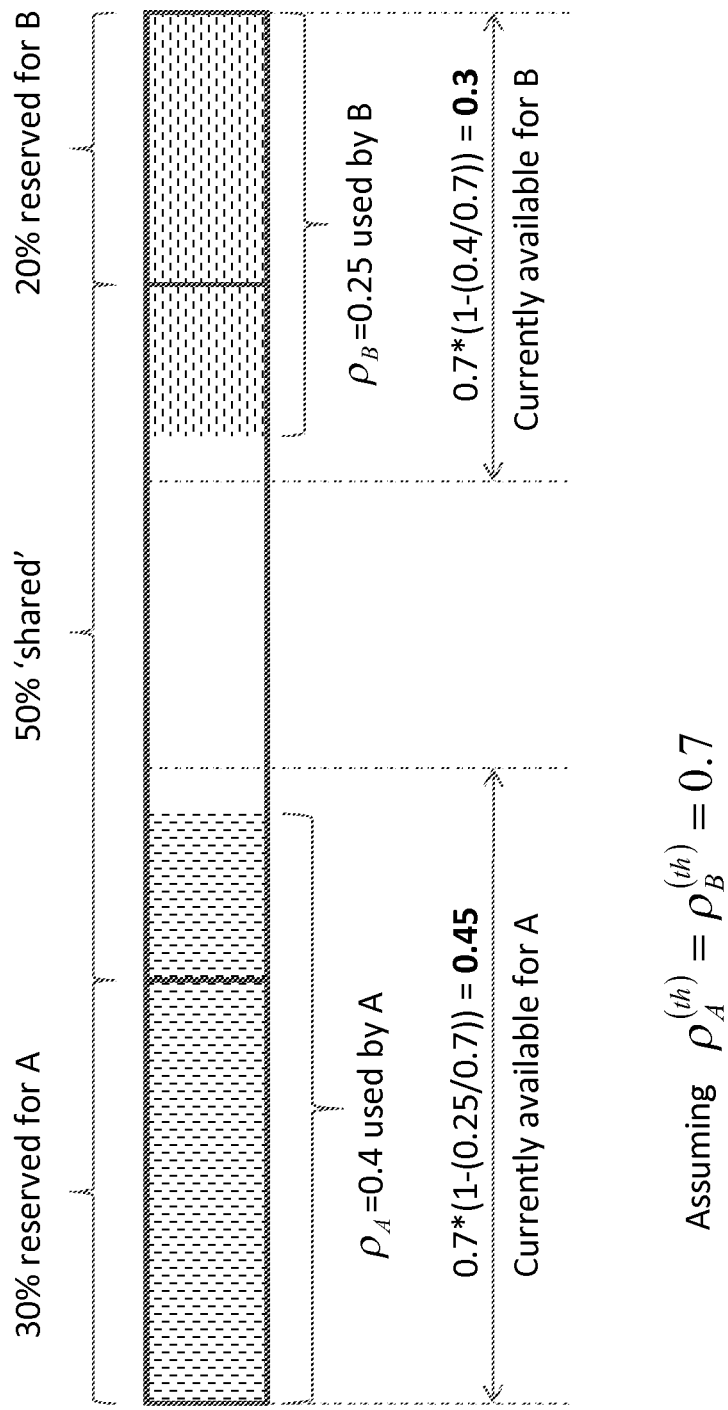
FIG. 6 shows a resource allocation scenario when an example admission control method is applied.

FIG. 6 illustrates an example scenario with two operator slices. In this scenario new communication bearers to operator slice A may be admitted until the load of slice A reaches 0.45 or new communication bearers to operator slice B may be admitted until the load of slice B reaches 0.3 (but not both). In this example, for sake of simplicity, it is assumed that $\rho_{new} = 0$.

AC Method 2

In the second exemplary admission control method, the load measurement module 64 first calculates the current load in the shared part, $\rho_{shared}$. $\rho_{shared}$ is, effectively, the total amount by which all operator slices are exceeding their respective AC thresholds in their own reserved parts and can be represented mathematically as follows:

$$\rho_{shared} = \sum_k \max(\rho_k - \rho_k^{(th)} t_k^{rsv}, 0)$$

Next, the load measurement module 64 calculates the amount of additional load expected in the shared part if the new communication bearer is admitted. This is the total load of the new communication bearer minus the amount (if any) that can be accommodated in the reserved part of operator g:

$$\Delta\rho_{shared} = \rho_{new} - \max(\rho_g^{(th)} t_g^{rsv} - \rho_g, 0)$$

Since $\Delta\rho_{shared} \leq \rho_{new}$ and the first stage test has failed (S507: NO) also implies that $\Delta\rho_{shared} \geq 0$. The new communication bearer of operator g is admitted to the shared part only if the following condition is met:

$$\rho_{shared} + \Delta\rho_{shared} < \rho_{shared}^{(th)} t_{shared}^{rsv}$$

where $0 < \rho_{shared}^{(th)} \leq 1$ is the AC threshold for the shared part. If this condition is not satisfied shared then the communication bearer is rejected.

Note that whereas the AC thresholds $\rho_g^{(th)}$ for admission to each operator's reserved part may be chosen by the respective operators themselves, the AC threshold for the shared part is preferably under the control of the network owner.

If $\rho_{new} = 0$, then $\Delta\rho_{shared} = 0$ because in this case $\Sigma_g \geq \rho_g^{(th)} t_g^{rsv}$ (since the first stage test, at S507, failed).

AC method 1 and AC method 2 are identical in both the case of no shared part $$\left(\sum_k t_k^{rsv} = 1\right)$$

and the case that all resources are shared ($t_k^{rsv} = 0$) between the network operators. Furthermore, AC method 1 and AC method 2 are also identical if all AC thresholds are the same, i.e. $\rho_k^{(th)} = \rho_{shared}^{(th)} = \rho^{(th)}$ for all k.

Figure 7:
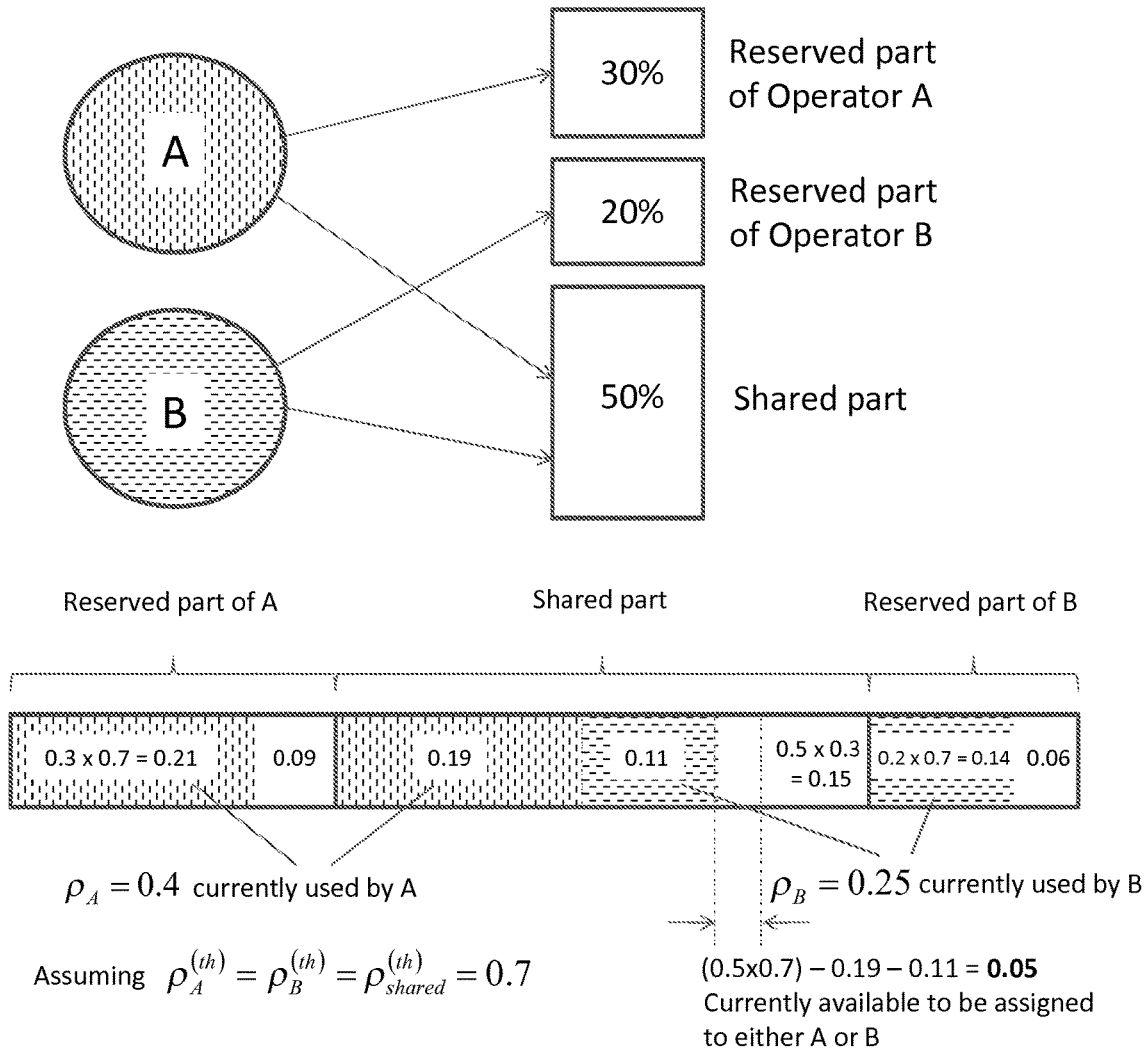
FIG. 7 shows a resource allocation scenario shown when an alternative admission control method is applied.

FIG. 7 illustrates an example scenario with two operator slices, using AC method 2.

The above description of a two-stage AC method in the RAN sharing case offers various benefits over previous admission control methods.

In particular, each operator is guaranteed a minimum number of PRBs per sub-frame (on average) when it is able to use them, regardless of whether its traffic is Guaranteed Bit Rate (GBR) or non-GBR. This minimum guaranteed resource is ensured by the operator's reserved part.

Further, new communication bearers are never blocked by AC if the reserved part of the corresponding operator is not fully utilized. However if an operator's reserved part is not being fully utilized in any given sub-frame, then the slice scheduler module 65 may assign the unused resources to communication bearers of other operators.

The portion of system resources that remain after subtracting the reserved part of each operator is called the shared part. AC admits new communication bearers belonging to any operator to the shared part on a first-come-first-served basis, provided that the operator's reserved part is already fully utilized.

The above method is applicable to both uplink and downlink. The method also allows any number of operators to share a base station.

Operation—Signalling Messages

Figure 8:
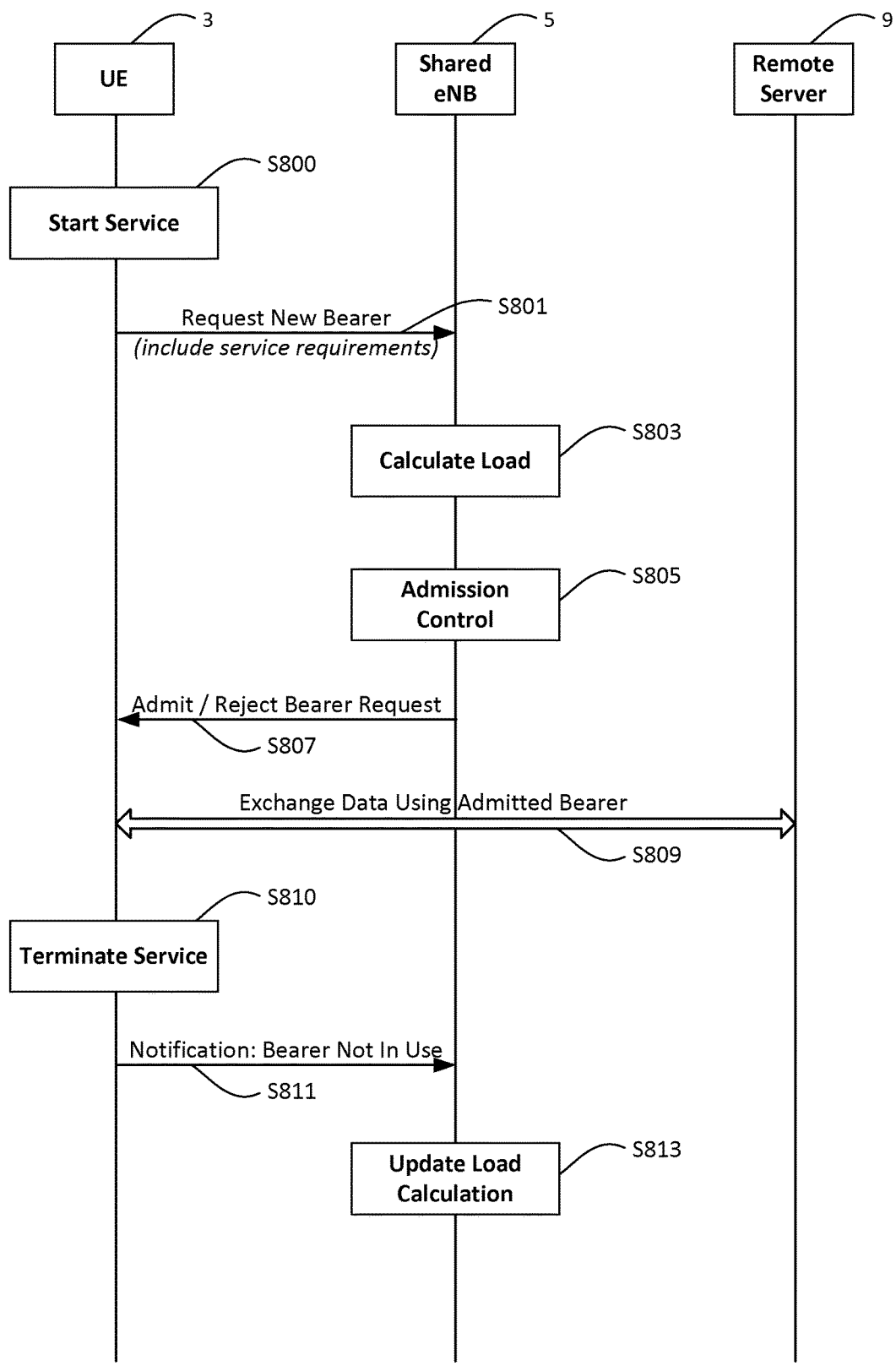
FIG. 8 is a timing diagram illustrating messages exchanged between elements of the telecommunications network of FIG. 1 whilst carrying out an embodiment of the invention.

FIG. 8 is a timing diagram illustrating messages exchanged between elements of the telecommunication system 1 of FIG. 1 whilst carrying out an exemplary embodiment of the invention.

First, a mobile telephone 3 (which might belong to either operator A or operator B) starts a service, as indicated at step S800, which requires communication with a remote server 9 (or another mobile telephone). Therefore, at step S801, the mobile telephone 3 generates and sends, to the shared base station 5, a request for setting up a new communication bearer. Upon (or prior to) receiving this request, the shared base station 5 (i.e. its load measurement module 64) calculates the current system load (e.g. as shown at steps S501 to S503 of FIG. 5).

Then, in response to the new communication bearer request, the shared base station 5 (i.e. using its admission control module 67) performs admission control to check whether or not the new communication bearer request can be accommodated given the current system load. Admission control may be performed generally as described above with respect to FIGS. 5 to 7.

Next, at step S807, the shared base station 5 generates and sends, to the requesting mobile telephone 3, a message informing this mobile telephone 3 whether or not the new communication bearer request is admitted or rejected.

If the new communication bearer request is admitted by the shared base station 5, the mobile telephone 3 and the remote server 9 (and/or any other party involved in the service) start communicating using the admitted communication bearer, as shown at step S809. It is to be noted that this communication might be carried out substantially continuously or in discontinuous bursts of transmission, depending on the type of service (e.g. GBR/non-GBR) and the amount of data to be transmitted. Although not shown in FIG. 8, at step S809, and for each sub-frame, the shared base station 5 will beneficially apply the exemplary slice scheduling method described with reference to FIG. 4.

If the new communication bearer request is rejected, at step S807, the mobile telephone 3 might resend the new communication bearer request either automatically (e.g. upon expiry of a timer) or upon user interaction (e.g. the user pressing an appropriate button on the mobile telephone 3).

Optionally, when the service is terminated (at step S810), the party terminating the service (i.e. in this case the mobile telephone 3) may generate and send, at step S811, a notification to the shared base station 5 that the communication bearer is no longer in use. This notification might be advantageously used by the load measurement module 64 of the shared base station 5 when it is next time performing load calculations, at step S813 (e.g. as shown at steps S501 to S503 of FIG. 5). This ensures that system load information is always available and is kept up-to-date at the shared base station 5, and will in turn prevent incorrectly admitting/ rejecting new communication bearer requests and allows optimisation of the overall system load.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

While the above described embodiments have been limited to two network operators sharing capacity at a base station or in the core network, it will be appreciated that three, four, or more network operators may share parts of the network, and that the described embodiments are equally applicable to networks shared by more than two operators.

For example, if more than two network operators are sharing the base station resources, in shared sub-frames, communication bearers of all sharing network operators may be prioritised on a shared basis.

Furthermore, in sub-frames that are not classified as shared sub-frames, after prioritising communication bearers for a particular network operator with the highest slice weight, any communication bearers of other network operators may be scheduled either on a shared basis or according to the slice weights of the respective operators to which these bearers belong. In essence, after having scheduled all communication bearers for the network operator with the highest slice weight, the scheduling prioritisation may be repeated for the remaining operators for any resources remaining in that sub-frame. Thus effectively, in a non-shared sub-frame, all network operators may be prioritised according to their respective weights until all resources of that sub-frame have been used up or there is no more communication bearer to process.

Consequently, the priorities illustrated in Table 1 may be modified as shown in Table 3 below.

TABLE 3

Example of MAC Scheduler Priority Setting

| Highest slice weight in sub-frame j | Bearer priorities applied in MAC scheduler at sub-frame j | Fraction of sub-frames on average |
|---|---|---|
| $W_{A,j}$ | GBR A > non-GBR A > GBR (B/C*) > non-GBR (B/C*) | Share of operator A (%) |
| $W_{B,j}$ | GBR B > non-GBR B > GBR (A/C*) > non-GBR (A/C*) | Share of operator B (%) |
| $W_{C,j}$ | GBR C > non-GBR C > GBR (A/B*) > non-GBR (A/B*) | Share of operator C (%) |
| $W_{shared,j}$ | GBR (A/B/C) > non-GBR (A/B/C)** | 100% - sum of the shares of all operators |

(*further prioritisation may be applied based on operator weight)
(**might apply a 'round-robin' scheme)

In the above exemplary embodiment, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, and the like.

In the above exemplary embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station in order to update its functionality. Similarly, although the above embodiments employed transceiver circuitry, at least some of the functionality of the transceiver circuitry can be performed by software.

According to a variation of the above described exemplary slice scheduling method, the so-called forgetting factor, $\beta$, may be advantageously applied by the slice scheduler module 65 as follows.

If a communication bearer belonging to a particular operator is added to the system when there were previously no bearers belonging to that operator, the measurement $t_{g,j}^{exp}$ will take some time to converge due to the action of the forgetting factor. In certain cases, this may cause communication bearers belonging to other operators to be starved of scheduling opportunities until the measurement has converged. To avoid this $\beta$ in the equations above may be replaced with the quantity $$\gamma = \max\left(\beta, \frac{1}{n_g}\right)$$

where $n_g$ is a counter which is incremented every sub-frame if communication bearers belonging to slice g are present and reset to 1 if no communication bearers belonging to slice g are present (or alternatively if no users have been present for some time interval). This has the effect of making the resource measurement converge faster, thus allowing the slice scheduler module 65 to reach a steady state more quickly than without applying a forgetting factor $\beta$.

In the above examples, base station resources are described as being shared by multiple network operators. Each operator has therefore at least one slice assigned to it and in addition may also rely on resources of a shared slice according to any of the exemplary prioritisation methods described above. In other words, air interface resources represented by the slices are prioritised based on user data transmitted to/from user equipment served by the respective network operator. However, it will be appreciated that alternatively (or in addition to the above), base station resources (i.e. air interface resources represented by the slices) might also be assigned to service providers (data source) rather than the service users (data destination, e.g. user equipment). In other words, a slice may be prioritised based on either end of the service data flow. This modification might advantageously be applied also in case of a base station exclusively used by a single network operator and allows sharing base station resources among supported service providers and/or service types.

For sake of simplicity, in the above description it is assumed that non-GBR bearer requests can always be admitted regardless of the traffic load conditions, since non-GBR bearers can tolerate high transmission delays and do not affect GBR traffic which is assigned higher priority in the MAC scheduler.

In the above description, PRB usage of GBR traffic is used as the metric for cell load measurements. This is known to be a simple but effective method for measuring the load of communication bearers generating data at a relatively steady rate. A possible simple method for determining load $\rho_g$, for example, is as follows. Where $n_i$ denotes the total number of PRBs that are actually assigned to GBR bearer i over a load measurement period of $\Delta T$ sub-frames and K denotes the total number of PRBs in the system bandwidth, one measure of the load of all communication bearers in operator slice g over this measurement period may be represented as:

$$\rho_g = \sum_{i \in g} \frac{n_i}{K \Delta T}$$

However, it will be appreciated that PRB usage of non-GBR bearers may also be taken into account in calculating system load. Further, it will be also appreciated that system load calculations may also account for signalling overheads that may be incurred for communications of each slice, such as downlink and uplink data allocation, bandwidth requests, retransmissions, and/or channel feedback.

The above discussion of the $1^{st}$ and $2^{nd}$ exemplary admission control methods assumes that each operator is allowed to use all of the shared part (if no other operator is using it). However, the skilled person would understand that a restriction on the maximum amount of the shared part that each operator is permitted to use may also be included. This may be achieved, for example, by modifying the admission condition for the shared part as follows:

$$\rho_{shared} + \Delta\rho_{shared} < \rho_{shared}^{(th)} t_{shared}^{rsv}$$

and $$\rho_g + \rho_{new} - \rho_g^{(th)} t_g^{rsv} < \rho_{shared}^{(th)} t_{shared}^{rsv} \eta_g$$

where $0 \le \eta_g \le 1$ is the maximum fraction of the shared part that may be used by operator g. The second term in the condition above checks that the resources used by operator g in the shared part are below a particular threshold. Note that if $\eta_g = 1$ for all operators then the second term is always satisfied and the expression reduces to the original admission condition.

This alternative may similarly be applied to AC method 1 by modifying the admission condition for the shared part as follows:

$$\rho_g + \rho_{new} < \rho_g^{(th)}\left(1 - \sum_{k \ne g} \max\left(\frac{\rho_k}{\rho_k^{(th)}}, t_k^{rsv}\right)\right)$$

and $$\rho_g + \rho_{new} - \rho_g^{(th)} t_g^{rsv} < \rho_{shared}^{(th)} t_{shared}^{rsv} \eta_g$$

In the above description of step S509 of FIG. 5, the shared base station is described to perform an admission control test to admit the new communication bearer into the shared part, and the $1^{st}$ and $2^{nd}$ exemplary admission control methods are given as examples for that test. However, it will be appreciated, that the shared base station may perform more than one test (e.g. any of the $1^{st}$ admission control method, the $2^{nd}$ admission control method, and the modified admission control method described in the previous paragraph), either sequentially or in a substantially parallel way. Furthermore, it will also be appreciated that the shared base station may perform a different admission control method for each network operator and/or for each communication bearer and/or for each mobile telephone.

Various other modifications will be apparent to those skilled in the art and will not be described in further detail here.

This application is based upon and claims the benefit of priority from United Kingdom patent application No. 1301656.3, filed on Jan. 30, 2013, the disclosure of which is incorporated herein in its entirety by reference.

What is claimed is:

1. A base station for sharing resources of a communication bandwidth between a plurality of network operators including first and second network operators, the base station comprising:
   a defining circuit configured to define:
   (a) a first operator proportion of the resources in said communication bandwidth, which first operator proportion represents a target average minimum proportion of the resources to be prioritized for communication bearers of the first network operator, over time;
   (b) a second operator proportion of the resources in said communication bandwidth, which second operator proportion represents a target average minimum proportion of the resources to be prioritized for communication bearers of the second network operator, over time; and
   (c) a shared proportion of the resources in said communication bandwidth, which shared proportion represents a proportion of the resources to be shared between communication bearers of the first network operator and communication bearers of the second network operator;
   an admission control circuit configured to control admission of a new communication bearer into one of said first operator proportion, and said second operator proportion, in dependence on the size of an operator proportion for that specific network operator, upon optimizing the resources for transmitting and receiving data to and from a mobile communication device belonging to the plurality of network operators;
   wherein said admission control circuit is operable to admit said new communication bearer when the following condition is met:

$$\rho_g + \rho_{new} < \rho_g^{(th)} t_g^{rsv}$$

where $\rho_g$ is an estimated current load represented by all communication bearers of network operator g; $\rho_{new}$ is an estimate of an expected additional load that will result if said new communication bearer is admitted; $\rho_g^{(th)}$ is an operator specific threshold value expressed as a fraction of the respective proportion of the resources of operator g, selected between 0 and 1; and $t_g^{rsv}$ is the size of the proportion of operator g.

2. The base station according to claim 1 wherein said admission control circuit is operable to apply at least one further admission condition if said condition is not met.

3. The base station according to claim 2 wherein said admission control circuit is operable to determine that said at least one further admission condition has been met when:

$$\rho_{shared} + \Delta\rho_{shared} < \rho_{shared}^{(th)} t_{shared}^{rsv}$$

where $\rho_{shared}$ is a current load represented by all communication bearers in said shared proportion of the resources; $\Delta\rho_{shared}$ is an expected change in a current load in said shared proportion if said new communication bearer would be admitted in said shared proportion; $\rho_{shared}^{(th)}$ is a threshold value expressed as a fraction of the shared proportion of the resources, selected between 0 and 1; and $t_{shared}^{rsv}$ is the size of said shared proportion.

4. The base station according to claim 2 wherein said admission control circuit is operable to reject admission of said new communication bearer into said shared proportion if said condition is not met and said at least one further admission condition is not met.

5. A system comprising the base station of claim 1.

* * * * *